United States Patent
Marshall et al.

(10) Patent No.: US 9,612,117 B2
(45) Date of Patent: Apr. 4, 2017

(54) INTEGRATED REACTION WHEEL ASSEMBLY ARRAYS AND MULTI-ROTOR CHASSIS SUITABLE FOR USAGE THEREIN

(71) Applicant: HONEYWELL INTERNATIONAL INC., Morristown, NJ (US)

(72) Inventors: Terence Marshall, Glendale, AZ (US); Paul Buchele, Glendale, AZ (US); Pietro Dileonardo, Glendale, AZ (US); Theodis Johnson, Litchfield Park, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 242 days.

(21) Appl. No.: 14/328,250

(22) Filed: Jul. 10, 2014

(65) Prior Publication Data

US 2016/0010991 A1    Jan. 14, 2016

(51) Int. Cl.
*G01C 19/06* (2006.01)
*G01C 19/16* (2006.01)
*B64G 1/28* (2006.01)

(52) U.S. Cl.
CPC ............. *G01C 19/16* (2013.01); *B64G 1/283* (2013.01)

(58) Field of Classification Search
CPC ........ G01C 19/16; G01C 19/04; G01C 25/00; B64G 1/283
USPC .......................... 74/5 R, 5.34, 5.37; 244/165
See application file for complete search history.

(56) References Cited

U.S. PATENT DOCUMENTS

| 3,269,179 A | * | 8/1966 | Anderson | G01C 21/16 33/321 |
| 3,489,004 A | * | 1/1970 | Barnhill | G01C 21/16 33/321 |
| 4,179,818 A | * | 12/1979 | Craig | G01C 21/16 33/321 |
| 4,211,452 A | | 7/1980 | Poubeau | |
| 4,212,443 A | * | 7/1980 | Duncan | G01C 21/16 244/165 |
| 4,723,735 A | | 2/1988 | Eisenhaure et al. | |

(Continued)

FOREIGN PATENT DOCUMENTS

| DE | 202006000022 U1 | 3/2006 |
| EP | 2399831 A1 | 12/2011 |
| WO | 0210015 A1 | 2/2002 |

OTHER PUBLICATIONS

Extended EP search report for Application No. 15172426.7-1754 dated Jul. 12, 2015.

(Continued)

*Primary Examiner* — William Kelleher
*Assistant Examiner* — Jake Cook
(74) *Attorney, Agent, or Firm* — Lorenz & Kopf, LLP (57) ABSTRACT

An integrated Reaction Wheel Assembly Array (RWAA) includes a multi-rotor chassis having a plurality of bearing locating features. A plurality of rotor assemblies is mounted to the multi-rotor chassis. Each rotor assembly includes a rotor having a rotor shaft, a spin motor coupled to the rotor and configured to drive rotation of the rotor about a spin axis, and a first spin bearing assembly disposed around an end portion of the rotor shaft. The first spin bearing pilots to one of the bearing locating features to position or locate the spin axis of the rotor assembly in a predetermined fixed spatial relationship relative to the spin axes of the other rotor assemblies.

17 Claims, 4 Drawing Sheets

(56) References Cited

U.S. PATENT DOCUMENTS

| | | | |
|---|---|---|---|
| 5,363,700 A * | 11/1994 | Joly | G01P 15/18 |
| | | | 73/431 |
| 5,708,312 A | 1/1998 | Rosen et al. | |
| 5,751,078 A | 5/1998 | Loewenthal | |
| 5,873,285 A | 2/1999 | Barnes | |
| 6,454,218 B1 | 9/2002 | Jacobson | |
| 6,515,221 B1 * | 2/2003 | Varga | B64G 1/54 |
| | | | 174/384 |
| 6,897,587 B1 | 5/2005 | McMullen et al. | |
| 7,051,608 B2 | 5/2006 | Guerrero | |
| 7,185,855 B2 * | 3/2007 | Peck | B64G 1/285 |
| | | | 244/165 |
| 7,900,874 B2 | 3/2011 | Fiala et al. | |
| 8,242,649 B2 | 8/2012 | Fradella | |
| 8,297,138 B2 | 10/2012 | Harrison | |
| 8,312,782 B2 | 11/2012 | McMickell et al. | |
| 2008/0047375 A1 | 2/2008 | Sonoura | |
| 2008/0099626 A1 | 5/2008 | Bialke | |
| 2009/0100957 A1 | 4/2009 | Winkel et al. | |
| 2013/0233100 A1 | 9/2013 | Kim | |

OTHER PUBLICATIONS

Marshall et al., "Meeting High-Quality RWA Commercial Demand Through Innovative Design," Honeywell, Dec. 31, 1999.
Honeywell, "Expedition 3-Axis 3 Axis RWA Based MCS," Mar. 2004.

* cited by examiner

INTEGRATED REACTION WHEEL ASSEMBLY ARRAYS AND MULTI-ROTOR CHASSIS SUITABLE FOR USAGE THEREIN

TECHNICAL FIELD

The present invention relates generally to attitude adjustment systems and, more particularly, to integrated reaction wheel assembly arrays including rotor assemblies, which pilot to a multi-rotor chassis to position the spin axes of the rotor assemblies in a predetermined spatial relationship.

BACKGROUND

Reaction Wheel Assemblies (RWA) are commonly deployed onboard satellites and other vehicles for attitude adjustment purposes. By common design, a RWA contains a rotor having a rotor shaft fixedly joined to an inertial element, such as an outer ring or rim. The rotor is typically mounted within a housing assembly including upper and lower halves, which are sealingly joined to enclose the rotor. The opposing ends of the rotor shaft are received within cylindrical cavities or bores provided in the housing assembly. Spin bearings are positioned around the shaft ends to facilitate rotation of the rotor relative to the housing assembly. During operation of the reaction wheel, a spin motor drives rotation of the rotor about a spin axis at a relatively high rate of speed thus establishing momentum. When it is desired to adjust the attitude of the host vehicle, control circuitry commands the spin motor to alter the rotational speed of the rotor and thereby change the momentum. The momentum change and resulting RWA system output torque is transferred, through the RWA housing assembly, and to the host vehicle to effectuate the desired attitude adjustment.

A single RWA can be combined with additional RWAs to produce a Reaction Wheel Assembly Array (RWAA). An RWAA containing at least three RWAs can perform highly controlled attitude adjustments about all three orthogonal axes. RWAA performance is optimized when the RWAs are mounted to the host vehicle such that a precise spatial relationship is achieved between the spin axes of the RWAs; e.g., when the RWAA contains three RWAs, the spin axes are ideally positioned in an exact orthogonal relationship. During installation of the RWAA, each RWA may be individually bolted or otherwise affixed to a different mounting interface provided on the host vehicle. In many cases, it may be necessary to adjust the orientation of each RWA to ensure that its spin axis is accurately oriented with respect to the spin axes of the other, separately-mounted RWAs. This wheel mounting process is typically carried-out by the customer or purchaser of the RWAs (as opposed to the RWA manufacturer) and can be undesirably timely, cumbersome, and complex to perform.

It is thus desirable to provide a Reaction Wheel Assembly Array wherein proper positioning between the spin axes of the RWAs (or rotor assemblies) included within the RWAA is achieved, while the above-described RWA mounting process is avoided. It would be particularly desirable if the positioning of the spin axes could be fixed or predetermined by the RWAA manufacturer in a highly precise, reliable, and straightforward manner. Ideally, embodiments of such an RWAA would also have a reduced part count, complexity, size, weight, and/or cost of manufacture as compared to conventional RWAAs. Still further desirable features of such an RWAA may include a centralized electronic infrastructure, improved radiation shielding provided by infrastructure outboard of the electronics, simplified evacuation port plumbing, and/or an overall increase in the structural robustness of the RWAA. Other desirable features and characteristics of embodiments of the present invention will become apparent from the subsequent Detailed Description and the appended Claims, taken in conjunction with the accompanying drawings and the foregoing Background.

The above-described limitations associated with conventional RWAAs are provided to establish an exemplary context in which embodiments of the present invention may be better understood and without implicit admission that any such limitations or drawbacks have been recognized by others in the relevant field. Similarly, the statements contained in the foregoing Background shall not, under any circumstances, be construed as an implicit admission that others in the relevant filed have recognized the desirability of producing an RWAA having the features or characteristics identified above as desirable, beneficial, or advantageous.

BRIEF SUMMARY

Embodiments of a consolidated or integrated RWAA are provided. In one embodiment, the RWAA includes a multi-rotor chassis having a plurality of bearing locating features. A plurality of rotor assemblies is mounted to the multi-rotor chassis. Each rotor assembly includes a rotor having a rotor shaft, a spin motor coupled to the rotor and configured to drive rotation of the rotor about a spin axis, and a first spin bearing assembly disposed around an end portion of the rotor shaft. The first spin bearing pilots to one of the bearing locating features to position or locate the spin axis of the rotor assembly in a predetermined fixed spatial relationship relative to the spin axes of the other rotor assemblies.

In a further embodiment, the integrated RWAA includes a multi-rotor chassis having a chassis body in which a plurality of rotor nests are formed. Rotor covers are sealingly coupled to the chassis body and enclose the rotor nests. A plurality of rotor assemblies are received in the rotor nests with each rotor assembly mounted between the multi-rotor chassis and one of the rotor covers for rotation about a spin axis.

Embodiments of a multi-rotor chassis are further provided. The multi-rotor chassis is utilized in conjunction with a plurality of rotor assemblies, which include rotors supported by spin bearing assemblies and rotatable about spin axes. In one embodiment, the multi-rotor chassis includes a chassis body and bearing locating features. The chassis body is configured to have the plurality of rotor assemblies mounted thereto. The bearing locating features are formed at different locations in the chassis body and engage the spin bearing assemblies to position the spin axes in a predetermined spatial relationship when the plurality of rotor assemblies is mounted to the chassis body.

BRIEF DESCRIPTION OF THE DRAWINGS

At least one example of the present invention will hereinafter be described in conjunction with the following figures, wherein like numerals denote like elements, and.

DETAILED DESCRIPTION

The following Detailed Description is merely exemplary in nature and is not intended to limit the invention or the application and uses of the invention. Furthermore, there is no intention to be bound by any theory presented in the preceding Background or the Detailed Description appearing below. While advantageously produced to provide all or most of benefits or desirable attributes the described below above, embodiments of the RWAA are not required to provide all or any of the below-described benefits to fall within the scope of the invention, as defined by the appended claims.

The following describes embodiments of an integrated or consolidated RWAA, which includes three or more rotor assemblies integrally mounted to a centralized structure or frame (referred to herein as a "multi-rotor chassis"). The rotor assemblies include spin bearing assemblies, which pilot or register to bearing locating features provided on the multi-rotor chassis to position the spin axes of the rotor assemblies in a predetermined fixed spatial relationship. Such a mounting interface enables spin axes orientation to be set precisely at the time of manufacture and avoids the need to perform an individual RWA mounting process of the type described in the foregoing section entitled "BACKGROUND." Embodiments of the multi-rotor chassis are also advantageously produced to include a number of pockets or nests in which the rotor assemblies are received when mounted to the chassis. In such embodiments, the multi-rotor chassis forms an integral part of the housing for each rotor assembly to reduce the overall part count, complexity, weight, cost, and size of the RWAA. Still further reductions in part count and cost can be achieved by integrating a shared electrical control system into the multi-rotor chassis and/or by forming a common evacuation port in the chassis body, which may be fluidly coupled to hermetically-sealed rotor compartments housing the rotor assemblies. Still further benefits provided by the below-described RWAA can include an enhanced structural robustness (especially in embodiments wherein the chassis body is formed as a single machined piece) and/or improved radiation shielding of control electronics housed within the multi-rotor chassis.

Figure 1:
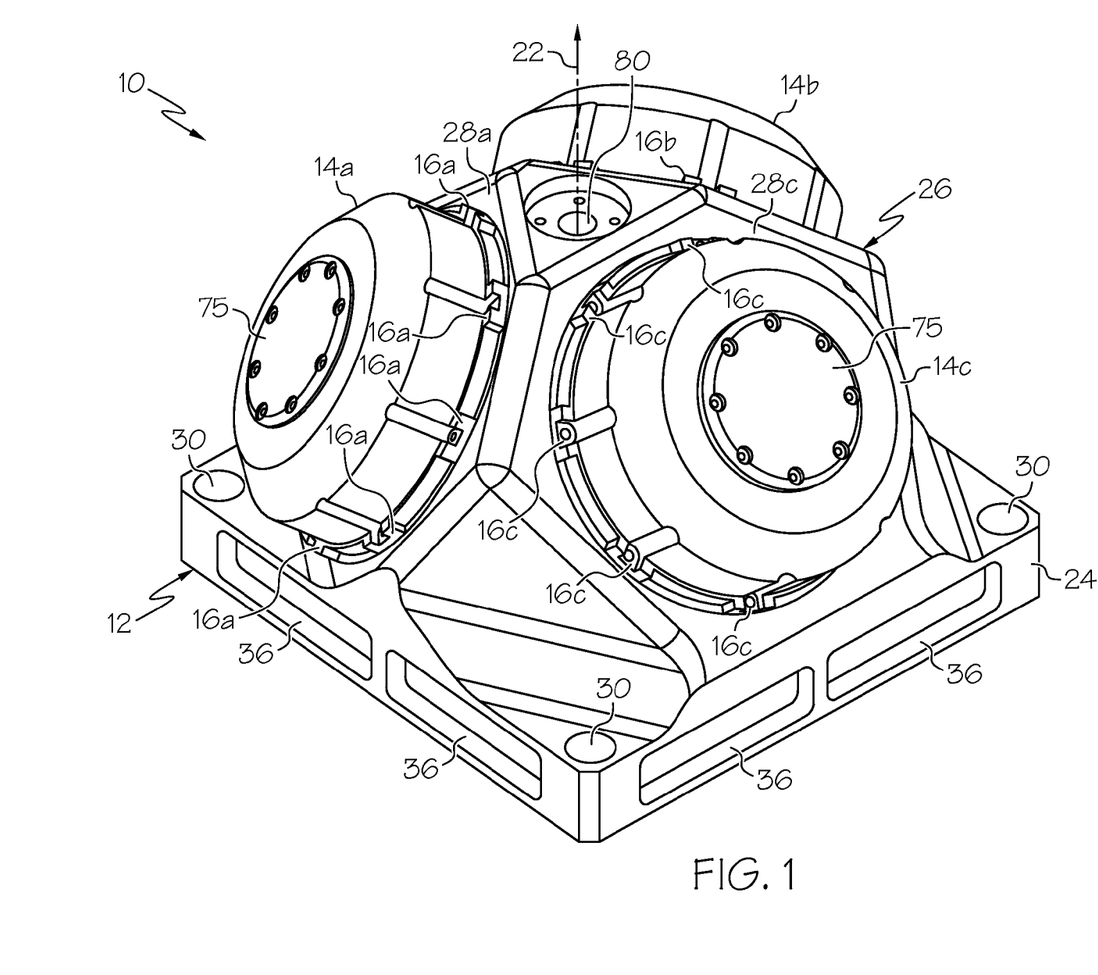
FIGS. 1 and 2 are top and bottom isometric views, respectively, of an integrated RWAA including a multi-rotor chassis and a plurality of rotor assemblies (hidden from view), as illustrated in accordance with an exemplary and non-limiting embodiment of the present invention.
Figure 2:
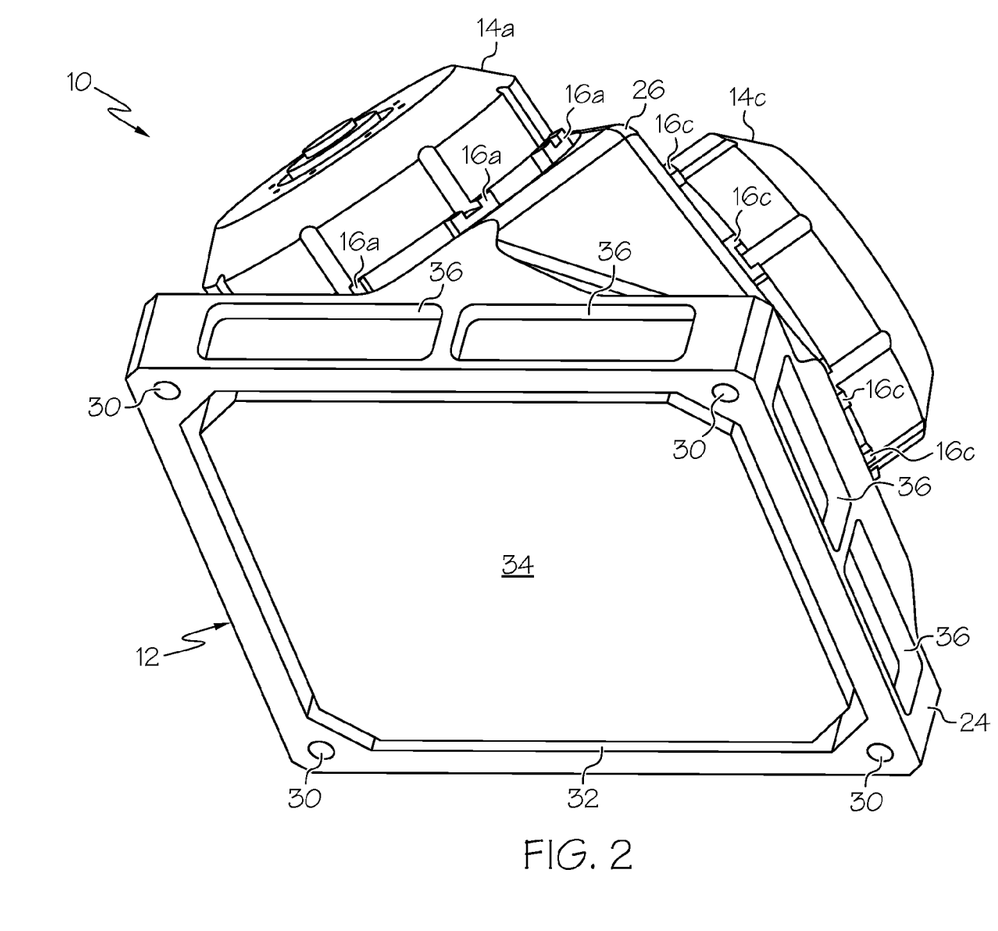
Figure 3:
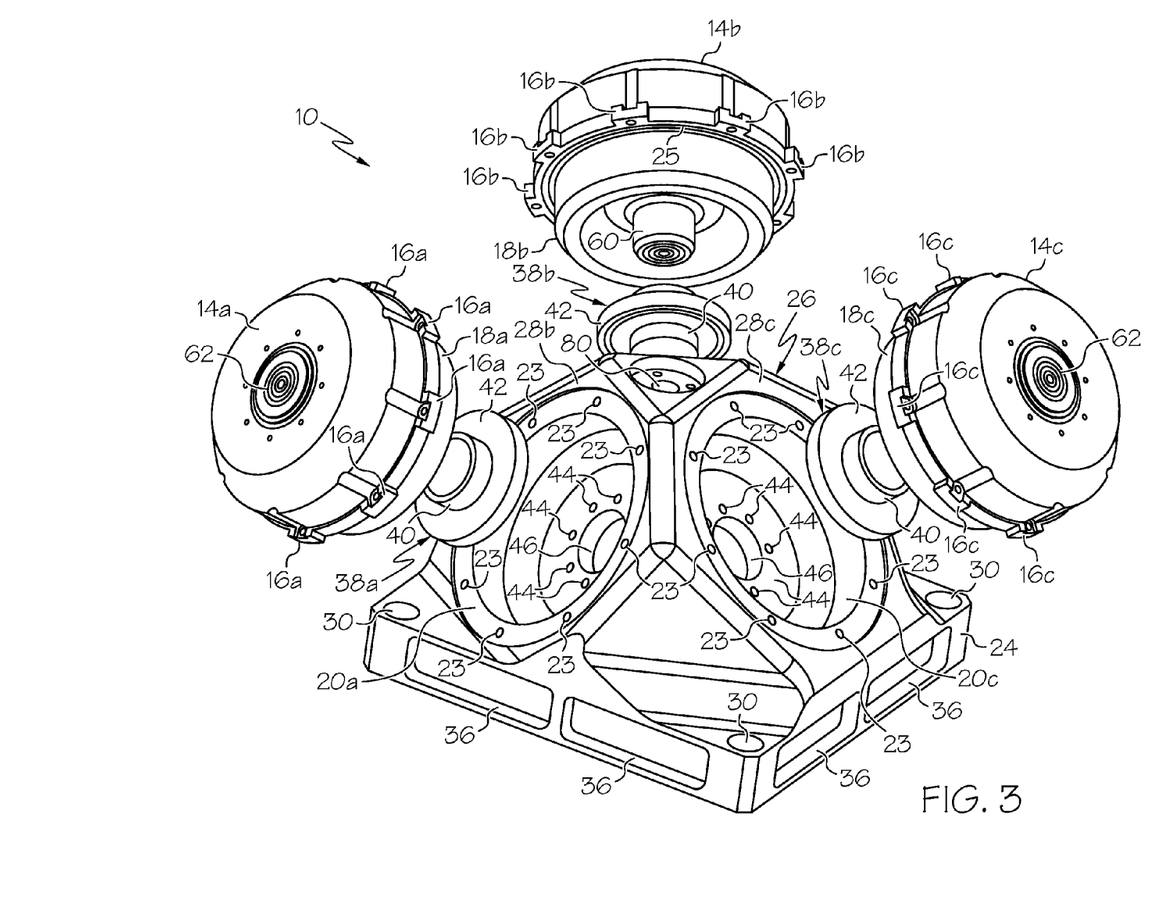
FIG. 3 is an exploded view of the integrated RWAA shown in FIGS. 1 and 2 in which the rotor assemblies can be seen, as can the bearing locating features of the multi-rotor chassis to which the rotor assemblies pilot.

FIGS. 1, 2, and 3 are top isometric, bottom isometric, and exploded views, respectively, of an integrated RWAA 10, as illustrated in accordance with an exemplary embodiment of the present invention. RWAA 10 includes a central frame or multi-rotor chassis 12, a number of rotor assemblies 18(a)-(c) mounted to chassis 12, and a corresponding number of rotor covers 14(a)-(c) attached to chassis 12 and positioned over rotor assemblies 18(a)-(c), respectively. Rotor assemblies 18(a)-(c) can be seen in FIG. 3, but are hidden from view in FIGS. 1 and 2 by covers 14(a)-(c). When mounted to chassis 12, rotor assemblies 18(a)-(c) are matingly received in a number of rotor pockets or nests 20(a)-(c) (FIG. 4), respectively. Rotor nests 20(a)-(c) are formed in multi-rotor chassis 12 and angularly spaced about the centerline thereof (represented in FIG. 1 by dashed line 22). Rotor covers 14(a)-(c) are positioned over rotor nests 20(a)-(c), respectively, and enclose rotor assemblies 18(a)-(c) therein. To facilitate attachment to chassis 12, rotor covers 14(a)-(c) are fabricated to include a number of circumferentially-spaced tabs 16(a)-(c) having fastener openings therein. Corresponding fastener openings 23 (FIG. 3) are further formed in chassis 12 around the mouths of nests 20(a)-(c) and align with the openings provided in tabs 16(a)-(c) to permit rotor covers 14(a)-(c) to be attached to chassis 12 utilizing a plurality of bolts or other such fasteners (not shown). Rotor covers 14(a)-(c) can be joined to multi-rotor chassis 12 such that a hermetic or airtight seal is formed therebetween. In this case, rotor covers 14(a)-(c) can be fabricated to include annular grooves 25 in the undersides thereof (one of which can be seen in FIG. 3), which each receive an O-ring (not shown) compressed between multi-rotor chassis 12 and covers 14(a)-(c) when secured to chassis 12.

Multi-rotor chassis 12 can assume any form suitable for supporting rotor assemblies 18(a)-(c) (FIG. 3), while physically locating the spin axes of rotor assemblies 18(a)-(c) in an orthogonal relationship or other predetermined spatial relationship, as described below. In the illustrated embodiment shown in FIGS. 1-3, multi-rotor chassis 12 includes a chassis body 24, 26 to which a number of bearing sleeves 38(a)-(c) are attached. Chassis body 24, 26 is divided into two general structures or regions: (i) a base structure 24, and (ii) a generally pyramidal rotor support structure 26, which extends from base structure 24 along centerline 22 (FIG. 1). Pyramidal structure 26 has a plurality of angled faces 28(a)-(c) into which rotor nests 20(a)-(c) are machined or otherwise formed. In the illustrated embodiment wherein RWAA 10 contains three rotor assemblies 18(a)-(c), pyramidal structure 26 has three angled faces 28(a)-(c), which are orthogonal to each other. Chassis body 24, 26 can be produced from any number of pieces or components, which are joined together by bonding, by welding, using hardware, by threaded interface, by thermal fit, or in any other manner. It is preferred, however, that chassis body 24, 26 is produced as a single piece or monolithic structure. In this case, chassis body 24, 26 can be produced from a near net blank or preform, which is then machined to define the more detailed features of chassis 12 including rotor nests 20(a)-(c). Chassis body 24, 26 can be produced from any suitable material or materials, but is preferably produced from a lightweight metal or alloy, such as aluminum. By producing chassis body 24, 26 as a single machined piece or part, the overall structural integrity of RWAA 10 can be enhanced, while part count is reduced.

Fastener openings 30 are provided in the corner regions of base structure 24 to facilitate attachment of multi-rotor chassis 12 to corresponding mounting interface provided on a host vehicle, such as a satellite or other spacecraft. As shown most clearly in FIG. 2, a recess or lower cavity 32 is further provided in the underside of base structure 24 to accommodate one or more electronic components of RWAA 10. For example, lower cavity 32 can house control circuitry in the form of a printed circuit board or circuit card 34 (FIG. 2). Circuit card 34 and any other electronic components housed within chassis 12 can be electrically coupled to the electronic components (e.g., spins motors, rate sensors, heaters, etc.) included within rotor assemblies 18(a)-(c). In this manner, a centralized control system can be provided thereby reducing complexity, part count, and cost as compared to other known RWAAs wherein an individual control system is integrated into each RWA included within the array. When multi-rotor chassis 12 is mounted to a host vehicle, lower cavity 32 may be optionally enclosed to protect circuit card 34, which can be electrically coupled to other electronics deployed onboard the vehicle. Circuit card 34 is well-shielded from radiation damage due, at least in part, to the manner in which the sidewalls of base structure 24 surround the periphery of circuit card 34, while pyramidal structure 26 and rotor assemblies 18(a)-(c) overlie or form a protective canopy over circuit card 34. If desired, a number of recesses or pockets 36 can be formed in the sidewalls of base structure 24 for weight reduction purposes.

The number of rotor assemblies included within RWAA 10 can vary amongst embodiments. In most cases, RWAA 10 will include either three rotor assemblies (as shown in FIG. 3) or four rotor assemblies. In embodiments wherein RWAA 10 includes a fourth rotor assembly in addition to three primary rotor assemblies, such as rotor assemblies 18(a)-(c) (FIG. 3), the fourth rotor assembly can supplement the operation of the primary rotor assemblies and provide redundancy should one of the rotor assemblies fail. The exemplary embodiment shown in FIG. 1-3 can be modified to incorporate a fourth rotor assembly by producing multi-rotor chassis 12 to include a fourth rotor nest in, for example, the topside or bottomside of chassis body 24, 26. In this case, the fourth rotor assembly may have a skewed orientation as compared to rotor assemblies 18(a)-(c), but may otherwise be mechanically and electrically integrated into RWAA 10 in essentially the manner as are rotor assemblies 18(a)-(c).

With continued reference to the exemplary embodiment shown in FIGS. 1-3, and as shown most clearly in FIG. 3, bearing sleeves 38(a)-(c) are installed in bottom central regions of rotor nests 20(a)-(c). Bearing sleeves 38(a)-(c) each include a cylindrical sleeve body 40 and a circumferential flange 42, which extends around an outer perimeter of sleeve body 40. A number of fastener openings 44 are formed in rotor nests 20(a)-(c) to enable attachment of circumferential flanges 42 to chassis 12 utilizing bolts or other fasteners. Additionally, a central aperture 46 can be provided in a bottom central region of each rotor nest 20(a)-(c) to accommodate the bottom portions of sleeve body 40, which extend axially from flanges 42 in a direction opposite rotor assemblies 18(a)-(c). A seal may be formed between the mating surfaces of bearing sleeves 38(a)-(c) and rotor nests 20(a)-(c) in embodiments wherein the rotor compartments are hermetically sealed. Sleeve bodies 40 include cylindrical cavities or bores 47, which mating receives spin bearing assemblies 60 (FIG. 3) included in one of rotor assemblies 18(a)-(c), as described more fully below. In so doing, bearing sleeves 38(a)-(c) position the spin bearing assemblies 60 and the respective spin axes of rotor assemblies 18(a)-(c). In further embodiments of RWAA 10, bearing sleeves 38(a)-(c) can be integrally formed with chassis body 24, 26 to further reduce part count by, for example, machining bores 47 directly into the respective floors of rotor nests 20(a)-(c). However, the multi-piece construction shown in FIGS. 1-3 enables bearing sleeves 38(a)-(c) and chassis body 24, 26 to be produced from different materials. This can be advantages in implementations wherein spin bearing assemblies 60 "float" or slide axially within bores 47 and it is desired to minimize gulling or wear of the interior of bearing sleeves 38(a)-(c), while reducing the overall weight of chassis body 24, 26. In this case, bearing sleeves 38(a)-(c) can be produced form a first material (e.g., steel) having a high abrasion resistance, while chassis body 24, 26 is produced from a second material (e.g., aluminum) having a lower density than does the first material.

Figure 4:
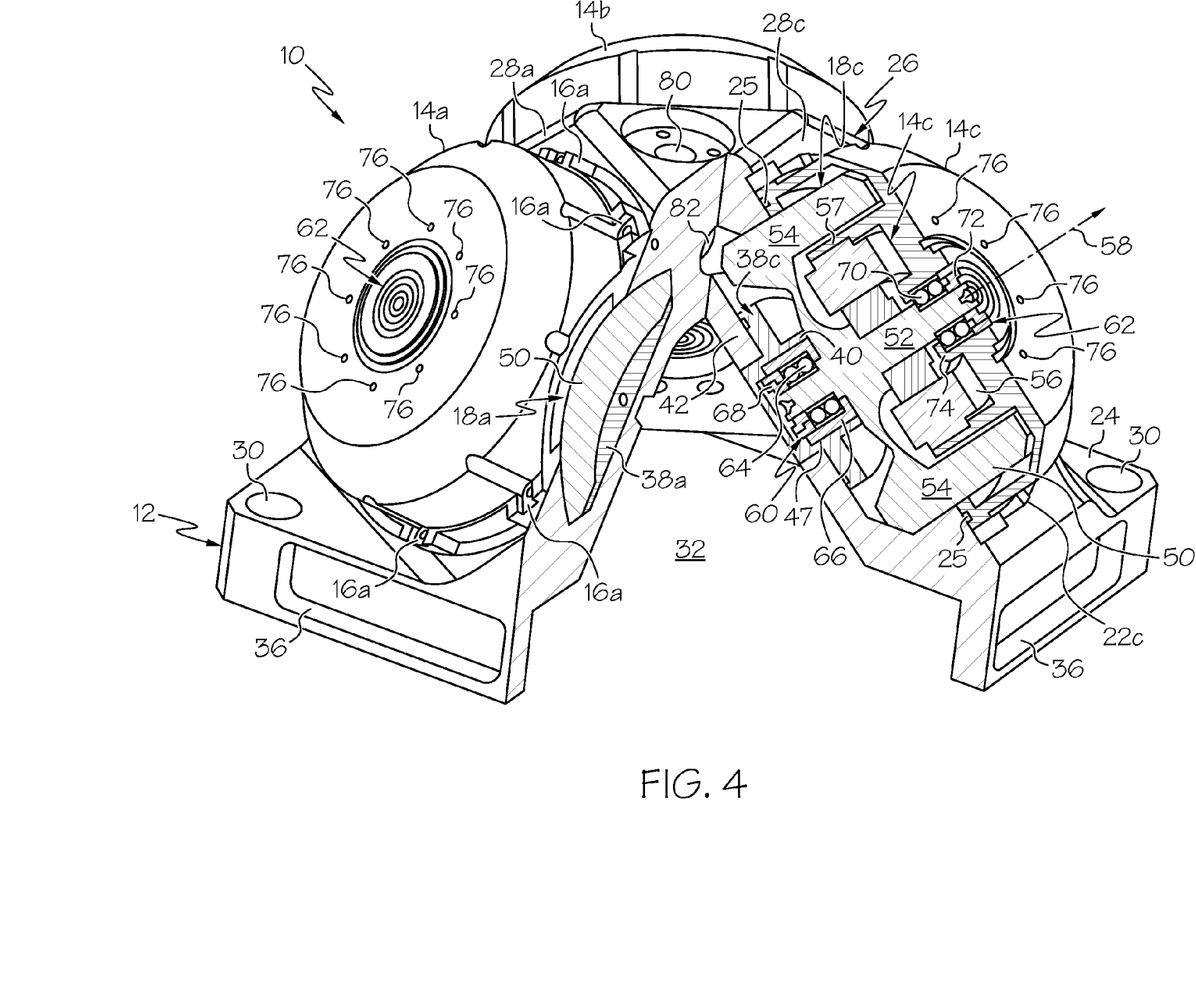
FIG. 4 is a cutaway view of the integrated RWAA shown in FIGS. 1-3, which includes a cut plane extending through one of the rotor assemblies shown in FIG. 3 and which more clearly illustrates the manner in which the rotor assembly interfaces with the multi-rotor chassis and its corresponding bearing locating feature.

FIG. 4 is a cutaway view of RWAA 10 (circuit card 34 not shown) illustrating the manner in which rotor assembly 18(c) interfaces with floating bearing sleeve 38(c) and rotor cover 14(c). Rotor assemblies 18(a)-(b) are substantially identical to rotor assembly 18(c) and thus the following description is equally applicable thereto. As shown in FIG. 4, rotor assembly 18(c) includes a rotor 50 having a rotor shaft 52 and an inertial element 54, such as an outer rim or ring. A spin motor 56 is positioned within an annular cavity provided in rotor 50. The stator of spin motor 56 is fixedly coupled to an inner annular wall 57 projecting axially from rotor cover 14(c), while the rotor of motor 56 is fixedly coupled to rotor shaft 52. When energized, spin motor 56 causes rotor 50 to rotate about a spin axis (represented in FIG. 5 by arrow 58). Spin bearing assemblies 60 and 62 are disposed around opposing end portions of rotor shaft 52 to facilitate high speed rotation of rotor 50 relative to multi-rotor chassis 12 and rotor cover 14(c). Spin bearing assemblies 60 and 62 are referred to below as the "inner" and "outer" spin bearing assemblies, respectively, in view of their relative proximity to the centerline 22 of RWAA 10 (identified in FIG. 1).

Spin bearing assemblies 60 and 62 can each include any number of components suitable for supporting rotor assembly 18(c), while minimizing friction between chassis 12 and assembly 18(c) during high speed rotation thereof. In the illustrated example, inner spin bearing assembly 60 includes a rolling element bearing 64 (e.g., a duplex ball bearing); a bearing cartridge 66, which surrounds bearing 64; and a cap piece 68, which retains bearing 64 within cartridge 66. As noted above, bearing assembly 60 is received within the bore 47 of bearing sleeve 38(c) such that assembly 60 can slide axially therein, but is otherwise physically prevented from lateral displacement or tilting. Bearing assembly 60 is thus considered a "floating" bearing assembly, which can move axially (within certain limits) to accommodate thermal expansion and contraction of rotor 50. By guiding the movement of bearing assembly 60 in this manner, bearing sleeve 38(c) determines the positioning and orientation of rotor assembly 18(c) and, therefore, spin axis 58 (FIG. 4). Bearing sleeve 38(c) is thus considered a "bearing locating feature" in the context of the present document, as is any structural feature or group of features that serve to physically locate or position a spin bearing assembly and thereby determine the spin axis orientation of the rotor assembly containing the bearing assembly. Bearing sleeves 38(a)-(b) likewise serve as "bearing locating features," which receive the spin bearing assemblies 60 of rotor assemblies 18(a)-(b), respectively, to position the spin axes thereof.

With continued reference to the exemplary embodiment shown in FIG. 4, outer spin bearing assembly 62 includes a rolling element bearing 70 (e.g., a duplex ball bearing) and a cap piece 72. Outer spin bearing assembly 62 is matingly received within an annular bearing retainer structure 74, which is formed in the underside of rotor cover 14(c) and into which the upper end of rotor shaft 52 extends. Bearing retainer structure 74 can be produced as a separate piece, which is attached to the underside of rotor cover 14(c). However, as indicated in FIG. 4, bearing retainer structure 74 is preferably integrally formed with cover 14(c) as a single machined piece to reduce the overall part count and complexity of RWAA 10. As noted above, bearing retainer structure 74 is also considered a "bearing locating feature" in that structure 74 engages spin bearing assembly 62 (and, specifically, the outer ring of rolling element bearing 70) to physically position rotor assembly 72 and thereby determine the positioning and orientation of spin axis 58. A cap piece (shown in FIG. 1 and identified by reference numeral "75") can also be affixed over the exterior of rotor cover 14(c) and cover bearing assembly 62. The cap piece can sealingly engage cover 14(c) to help preserve the hermetic environment of the rotor chamber in which rotor assembly 18(c) is housed. As identified in FIG. 4, fastener openings 76 can be provided on the exterior of rotor cover 14(c) to permit attachment of such a cap piece. Additionally, an O-ring can be disposed in an annular groove 78 formed in rotor cover 14(c) and sealingly compressed by the cap piece when attached to cover 14(c). As further indicated in FIG. 1, additional cap pieces can likewise be attached to covers 14(a)-(b) and cover the bearing assemblies 62 included within rotor assemblies 18(a)-(c), respectively, for sealing purposes.

In contrast to inner spin bearing assembly 60, outer spin bearing assembly 62 is a "fixed" bearing assembly. Spin bearing assembly 62 is thus affixed to rotor cover 14(c) and cannot move axially relative to cover 14(c) or multi-rotor chassis 12. In further embodiments, outer spin bearing assembly 62 can be a floating bearing assembly, while inner spin bearing assembly 60 can be a fixed spin bearing assembly. In this case, inner spin bearing assembly 60 can be bolted or otherwise affixed to the floor of rotor nest 20(c), and the mounting interface to which bearing assembly 60 is attached (e.g., fastener openings provided in a bottom central region of nest 20(c)) would be considered "bearing locating features." Furthermore, in such an embodiment, outer spin bearing 62 (the floating bearing assembly) can be produced to include a floating bearing cartridge, which is matingly housed by and can slide axially relative to a structure integrally fixedly coupled to (e.g., integrally formed with or attached to) the underside of cover 14(c). Such an embodiment (wherein the inner end of shaft 50 and bearing assembly 60 are axially fixed) can potentially provide improved thermal performance as a more efficient heat transfer path may be provided through the fixed end of rotor shaft 50, through the fixed bearing assembly, and to rotor chassis 12. By comparison, the illustrated embodiment (wherein the inner end of shaft 50 and bearing assembly 60 are axially floating) may advantageously provide a reduced part count and may ease assembly.

When rotor cover 14(c) is attached to multi-rotor chassis 12, the interior of rotor cover 14(c) cooperates with the interior of rotor nest 20(c) to define a chamber or compartment 14, 20 housing rotor assembly 18(c). So too do the interior surfaces of rotor nests 20(a)-(b) and rotor covers 14(a)-(b) combine to define a number of rotor chambers 14, 20 in which rotor assemblies 18(a)-(b) are housed, respectively. In certain embodiments, rotor chambers 14, 20 are hermetically sealed and may be at least partially evacuated to create a vacuum therein for terrestrial testing purposes. In this case, multi-rotor chassis 12 is advantageously produced to include a common evacuation port 80, which is fluidly coupled to each hermetically-sealed rotor chamber. In this regard, flow passages 82 (one of which can be seen in FIGS. 3 and 4) can be machined into multi-rotor chassis fluidly connecting port 80 to the rotor chambers. Relative to conventional RWAAs containing a number of discrete or independent RWAs, which each include an evacuation port and its associated plumbing, such a design further reduces part count, complexity, and costs and simplifies the overall testing process.

There has thus been provided an exemplary embodiment of an integrated RWAA, which includes three or more rotor assemblies integrally mounted to a multi-rotor chassis. Notably, the above-described RWAA integrates external housings and bearing mounting features into a common, simplified structure or multi-rotor chassis reducing overall RWAA volume. Overall part count, complexity, weight, cost, and size of the RWAA are reduced as a result. In certain embodiments, still further reductions in part count and cost are achieved by integrating a common or global control electronics into the multi-rotor chassis and/or by forming a common evacuation port in the chassis fluidly coupled to the hermetically-sealed chambers or compartments housing the rotor assemblies. Furthermore, in at least some embodiments, the spin bearing assemblies pilot or register to structural features provided in or on the multi-rotor chassis such that the spin axes of the rotor assemblies can be precisely positioned in a desired spatial relationship, such as an orthogonal relationship, when the rotor assemblies are mounted to the chassis thereby avoiding the need to separately mount a number of RWAs to the host vehicle and subsequently perform individual adjustments in RWA orientation. Embodiments of the integrated RWAA described herein may also have an enhanced structural robustness (especially in embodiments wherein the chassis body is produced as a single, machined piece), are readily scalable, and can provide improved radiation shielding of control electronics housed within the chassis body.

The foregoing has also provided embodiments of a multi-rotor chassis for usage in conjunction with a plurality of rotor assemblies, which includes rotors supported by spin bearing assemblies and rotatable about spin axes. While primarily described above as reaction wheel assemblies, it is emphasized that the rotor assemblies could also be gyroscopic rotor assemblies such that the multi-rotor chassis would be included in a gyroscopic array. As will be recognized by one of ordinary skill in the relevant field, such a modification wherein gyroscopic rotor assemblies as opposed to reaction wheel rotor assemblies are utilized in conjunction with the multi-rotor chassis will typically require relatively minor, if any changes in hardware; although the multi-rotor chassis will typically be smaller in scale when utilized within a gyroscopic sensor array. With this in mind, an exemplary embodiment of the multi-rotor chassis can include a chassis body configured to have the plurality of rotor assemblies mounted thereto (whether reaction wheel-type rotor assemblies or gyroscope-type rotor assemblies), as well as bearing locating features coupled to the chassis body. The bearing features can be embodiment in separate hardware (e.g., bearing sleeves) joined to the chassis body; or can be integrally formed with the chassis body as, for example, machined features. The bearing locating features engage the spin bearing assemblies to position the spin axes in a predetermined spatial relationship when the plurality of rotor assemblies is mounted to the chassis body. In certain embodiments, a plurality of rotor nests can be formed in the chassis body, with each rotor nest sized and shaped to matingly receive one of the rotor assemblies therein. In this case, the bearing locating features can be formed or disposed in bottom central regions of the plurality of rotor nests.

While at least one exemplary embodiment has been presented in the foregoing Detailed Description, it should be appreciated that a vast number of variations exist. It should also be appreciated that the exemplary embodiment or exemplary embodiments are only examples, and are not intended to limit the scope, applicability, or configuration of the invention in any way. Rather, the foregoing Detailed Description will provide those skilled in the art with a convenient road map for implementing an exemplary embodiment of the invention. It being understood that various changes may be made in the function and arrangement of elements described in an exemplary embodiment without departing from the scope of the invention as set forth in the appended Claims.

What is claimed is:

1. An integrated Reaction Wheel Assembly Array (RWAA), comprising:
   a multi-rotor chassis comprising a plurality of bearing locating features and a plurality of rotor nests;
   a plurality of rotor assemblies mounted to the multi-rotor chassis, each rotor assembly comprising:
      a rotor having a rotor shaft;
      a spin motor coupled to the rotor and configured to drive rotation of the rotor about a spin axis; and
      a first spin bearing assembly disposed around an end portion of the rotor shaft, the first spin bearing assembly piloting to one of the bearing locating features to place the spin axis of the rotor assembly in a predetermined spatial relationship with the spin axes of the other rotor assemblies;
   a plurality of rotor covers disposed over the plurality of rotor nests and enclosing the plurality of rotor assemblies;
   a plurality of sealed rotor compartments containing the plurality of rotor assemblies and defined, at least in part, by the plurality of rotor covers and the plurality of rotor nests; and
   a common evacuation port formed in the multi-rotor chassis and fluidly coupled to each of the plurality of sealed rotor compartments.

2. The integrated RWAA of claim 1 wherein each bearing locating feature is formed in a bottom central region of one of rotor nests.

3. The integrated RWAA of claim 1 wherein the multi-rotor chassis comprises a generally pyramidal structure having a plurality of angled faces in which the plurality of rotor nests are formed.

4. The integrated RWAA of claim 1 wherein the plurality of rotor assemblies each further comprise a second spin bearing assembly disposed around a second, opposing end of the rotor shaft; and wherein the plurality of rotor covers comprise a second plurality of bearing locating features to which the second spin bearing assemblies pilot.

5. The integrated RWAA of claim 1 further comprising control electronics housed within multi-rotor chassis and electrically coupled to the spin motors included within the plurality of rotor assemblies.

6. The integrated RWAA of claim 5 wherein the multi-rotor chassis further comprises a base structure having a cavity therein, and wherein the control electronics are housed within the cavity.

7. The integrated RWAA of claim 1 wherein the spin axes of the plurality of rotor assemblies are positioned in an orthogonal relationship when mounted to the multi-rotor chassis.

8. The integrated RWAA of claim 1 wherein the multi-rotor chassis comprises a monolithic chassis body in which the plurality of rotor assemblies are nested.

9. An integrated Reaction Wheel Assembly Array (RWAA), comprising:
   a multi-rotor chassis, comprising:
      a chassis body fabricated from a first material and in which a plurality of rotor nests is formed; and
      bearing sleeves installed in bottom central regions of the plurality of rotor nests formed in the chassis body, the bearing sleeves fabricated from a second material different than the first material;
   rotor covers coupled to the chassis body and enclosing the rotor nests; and
   a plurality of rotor assemblies received in the rotor nests and each including a first spin bearing matingly received by one of the bearing sleeves.

10. The integrated RWAA of claim 9 wherein the plurality of rotor assemblies each further comprise a second spin bearing assembly mounted to an interior portion of one of the rotor covers.

11. The integrated RWAA of claim 9 wherein the bearing sleeves each comprise:
   a sleeve body; and
   a circumferential flange extending at least partially around an outer perimeter of the sleeve body, the circumferential flange affixed to the chassis body of the multi-rotor chassis.

12. The integrated RWAA of claim 9 wherein the chassis body further comprises central apertures provided in bottom central portions of the plurality of rotor nests, the bearing sleeves at least partially received within the central apertures.

13. The integrated RWAA of claim 9 wherein the bearing sleeves comprise sleeve bodies in which cylindrical cavities are provided, the cylindrical cavities receiving the first spin bearings and dimensioned to permit axial sliding movement of the first spin bearings during operation of the integrated RWAA.

14. The integrated RWAA of claim 9 further comprising bearing retainer structures integrally formed with interior portions of the rotor covers;
   wherein the plurality of rotor assemblies each further comprise a second spin bearing matingly received by one of the bearing retainer structures.

15. A multi-rotor chassis for usage in conjunction with a plurality of rotor assemblies, the plurality of rotor assemblies comprising rotors supported by spin bearing assemblies and rotatable about spin axes, the multi-rotor chassis comprising:
   a chassis body including a plurality of rotor nests configured to matingly receive the plurality of rotor assemblies;
   bearing locating features coupled to the chassis body, the bearing locating features engaging the spin bearing assemblies to position the spin axes in a predetermined spatial relationship when the plurality of rotor assemblies is mounted to the chassis body; and
   a common evacuation port formed in the chassis body and fluidly coupled to each of the plurality of rotor nests.

16. The multi-rotor chassis of claim 15 further comprising a plurality of bearing sleeves coupled to the chassis body and defining the bearing locating features.

17. The multi-rotor chassis of claim 15 wherein the bearing locating features are located in bottom central regions of the plurality of rotor nests.

* * * * *